Dec. 15, 1936.                A. V. HAEFF                2,064,469
DEVICE FOR AND METHOD OF CONTROLLING HIGH FREQUENCY CURRENTS
Original Filed Oct. 23, 1933    6 Sheets-Sheet 1

Dec. 15, 1936.  A. V. HAEFF  2,064,469
DEVICE FOR AND METHOD OF CONTROLLING HIGH FREQUENCY CURRENTS
Original Filed Oct. 23, 1933    6 Sheets-Sheet 3

Inventor
Andrew V. Haeff
By Lyon&Lyon
Attorneys

Dec. 15, 1936. A. V. HAEFF 2,064,469
DEVICE FOR AND METHOD OF CONTROLLING HIGH FREQUENCY CURRENTS
Original Filed Oct. 23, 1933 6 Sheets-Sheet 4

Inventor
Andrew V. Haeff
By Lyon & Lyon
Attorneys

Dec. 15, 1936.　　　　　A. V. HAEFF　　　　　2,064,469
DEVICE FOR AND METHOD OF CONTROLLING HIGH FREQUENCY CURRENTS
Original Filed Oct. 23, 1933　　6 Sheets-Sheet 5

Inventor
Andrew V. Haeff
By Lyon & Lyon
Attorneys

Patented Dec. 15, 1936

2,064,469

UNITED STATES PATENT OFFICE 2,064,469

DEVICE FOR AND METHOD OF CONTROLLING HIGH FREQUENCY CURRENTS

Andrew V. Haeff, Pasadena, Calif., assignor, by mesne assignments, to Radio Corporation of America, New York, N. Y., a corporation of Delaware Application October 23, 1933, Serial No. 694,794
Renewed May 20, 1936

23 Claims. (Cl. 250—27)

This invention relates broadly to the art of generating, controlling and measuring high frequency electric waves and is particularly useful with waves of such extremely high frequencies that they cannot be effectively controlled with vacuum tubes of conventional types now in general use because of the inter-electrode capacity and low electron velocity characteristics of conventional tubes.

A broad object of the invention is to provide apparatus for and methods of efficiently generating, controlling and measuring extremely high frequency electric waves.

Another object is to increase the sensitivity and stability of apparatus for generating, controlling and measuring extremely high frequency waves.

Most conventional vacuum tubes for use in connection with radio frequency currents employ a grid or grids placed in an electron stream created between a cathode and an anode mounted in an evacuated container; by applying an alternating potential between the cathode and grid, the rate of flow of the electrons to anode is varied in synchronism with the alternating potential applied to the grid. Tubes of this type have definite upper frequency limitations because at extremely high frequencies the inherent inter-electrode capacity effectively short circuits those elements and prevents the building up of any substantial potential difference between the cathode and grid, and, further, because at extremely high frequencies the grid potential reverses in a time less than that required for electrons to travel from the cathode to the grid. For these reasons, tubes of the conventional type described become inoperative, for all practical purposes, as extremely high frequencies.

In accordance with the present invention, the aforementioned difficulties encountered with conventional tubes are avoided by using as a controlling device a modification of the well known cathode ray oscillograph, in which an electron stream is deflected laterally and thereby caused to impinge to a varying extent on one or more suitably positioned anodes. This method differs fundamentally from the method of operation of the conventional vacuum tubes previously mentioned since in the latter, the rate of flow of electrons in a stream is varied instead of the electron stream being deflected laterally.

The theory of operation of my invention and various forms of apparatus in which it can be employed will be explained in detail with reference to the drawings, in which.

Figure 1:
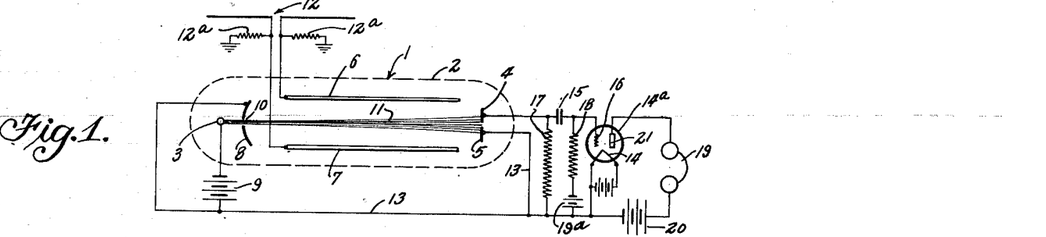
Fig. 1 is a schematic diagram of a radio receiving circuit employing an electronic tube of the general type to which this invention relates.

Referring to Fig. 1, there is shown an electronic tube, designated generally at 1, comprising an evacuated receptacle 2 containing a cathode 3, a pair of anodes 4 and 5, and a pair of control electrodes 6 and 7. The cathode 3 may be of any suitable type adapted to be heated and having a coating of high electron emitting characteristics whereby it emits large quantities of electrons. A grid 8, which may be of various shapes, is positioned adjacent the cathode 3 and maintained at positive potential with respect to the cathode by means of a battery or other suitable source of potential 9. Because of its potential, the grid 8 attracts electrons from the cathode 3, many of which electrons impinge upon the grid and produce no useful result. However, some of the electrons pass through an aperture 10 in the center of the grid 8 and travel longitudinally through the tube to the anodes 4 and 5, these electrons constituting an electron stream 11. It is to be understood that cathodes in combination with focusing devices for producing and directing a stream of electrons, are old, and that various particular forms of apparatus have been developed for this purpose, some of which may be substituted for the particular apparatus shown in Fig. 1. In the type of apparatus disclosed, the electrons in the stream 11 travel at substantially constant velocity from the grid 8 to the anodes 4 and 5 since those elements are maintained at substantially the same potential. By properly designing the electron emitting and concentrating apparatus, the electron stream 11 may be confined to a relatively small cross sectional area.

The control electrodes 6 and 7 are positioned parallel to each other on opposite sides of the electron stream 11 and are adapted to be connected at one end to a suitable source of high frequency oscillations such as an antenna 12. The antenna is preferably connected to ground through impedance elements 12a to stabilize the average potentials of the electrodes 6 and 7.

The anodes 4 and 5 are preferably of somewhat larger areas than the cross sectional dimensions of the electron stream 11 and are positioned close together so that under normal conditions the stream 11 impinges on both anodes. In the particular circuit shown, the anode 5 is connected directly by conductor 13 to the grid 8 and is also connected to the cathode 14 of a conventional three-electrode amplifying tube 14a. The anode 4 of tube 1 is connected through a condenser 15 to the grid 16 of the three-electrode tube 14a and a high impedance element 17 is connected between the anode 4 and the conductor 13. A grid leak 18 and a C battery 19 may be connected in series between the cathode 14 and grid 16 of the three-electrode tube 14a to properly bias the grid 16. A telephone 19a may be connected in series with a B battery 20 between the cathode 14 and anode 21 of the three-electrode tube to produce an audible signal in response to a modulated wave detected by the tube 1 and amplified by the tube 14a.

When no potentials are applied to the control electrodes 6 and 7, the electron stream 11 impinges upon both anodes 4 and 5, setting up direct currents therein which flow through the conductor 13 back to the cathode 3. Since the condenser 15 offers substantially infinite impedance to direct currents, the potential of the grid 16 is constant, being determined by the battery 19, and the current flowing in the output circuit of the three-electrode tube 14a and the telephone 19a is constant.

When the antenna 12 is exposed to radio waves, currents of the frequency of the radio waves are generated in the antenna and applied to the control electrodes 6 and 7. If the waves are of relatively low frequency, the potential of all parts of each electrode 6 and 7 will be substantially the same at any instant but during half of each cycle one electrode will be positive and the other negative, whereas during the other half of each cycle the polarities of each electrode will be reversed. When the control electrodes 6 and 7 are at opposite potentials, an electric field exists between them which exerts a force on each electron in the stream 11, tending to shift the electrons laterally from their normal longitudinal path of travel. Thus during that half of each cycle when the electrode 6 is positive and the electrode 7 is negative, the stream 11 will be deflected upwardly to impinge to a greater extent on the anode 4 and during the intervening half cycles when the electrode 7 is positive with respect to the electrode 6, the stream 11 will be deflected downwardly so that it impinges to a lesser extent on the anode 4. It follows that the number of electrons impinging on anode 4 will be varied in synchronism with the radio wave. Since the electronic current to anode 4 is made to pass through the impedance 17, the voltage across this impedance will vary with the frequency of the radio wave. However, if the impedance 17 is of such a nature that it offers low impedance for the radio frequency, the radio frequency voltage across impedance 17 will be small. If the radio wave is modulated with a signal wave, such as an audio-frequency current, its amplitude will vary in accordance with the signal. Now, if the stream 11 is directed on the anodes 4 and 5 in such a manner that the average current to anode 4 varies with the amplitude of the radio wave on the controlling elements 6 and 7, then the average potential across impedance 17 will vary with signal frequency, the element 17 offering high impedance for signal frequency. The varying potential across element 17 is applied through the condenser 15 to the grid 16 of the three-electrode amplifying tube 14a and correspondingly varies the current in the output circuit of the tube 14a to reproduce the audio signal in the telephone 19a.

Results theoretically can be obtained at any frequency, but at high frequency the sensitivity is extremely low so as to make this device impractical. When the frequency of the radio waves applied to the electrodes 6 and 7 is so low that the time of a complete cycle is large as compared with the time required for an electron in the stream 11 to travel the length of the electrodes 6 and 7, electrons, while travelling between the control electrodes 6 and 7, will be urged in a single lateral direction (either toward the electrode 6 or toward the electrode 7) throughout its path. Hence the path of the electrons will be substantially parabolic and the extent of lateral deflection will increase rapidly with the length of the electron stream and the length of the electrodes 6 and 7. It will be readily apparent, therefore, that the sensitivity of a tube of this type depends to a large extent upon the length of the electron stream and of the electrodes 6 and 7.

Figure 2:
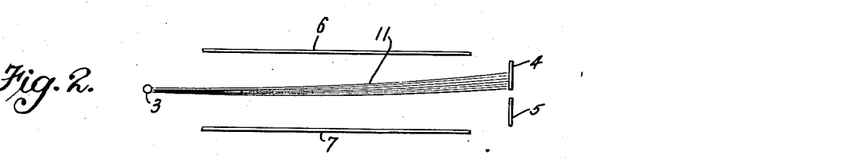
Fig. 2 is a schematic diagram illustrating the deflection of the electron stream in the tube of Fig. 1 when the period of the applied alternating current is long as compared to the time required for the electrons to travel through the tube.

Fig. 2 shows clearly the deflection of the electron stream 11 under the conditions described, at an instant when the electrode 6 is positive and the electrode 7 is negative. It will be observed that the electron stream is diverted toward the anode 4. Of course, during the succeeding half cycle the conditions will be reversed and the electron stream will be diverted toward anode 5.

Figure 3:
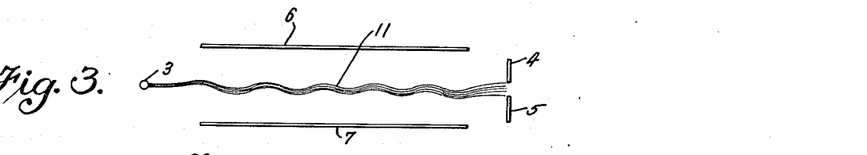
Fig. 3 is a schematic diagram illustrating the deflection of the electrons in the tube of Fig. 1 when the period of the applied alternating current is short as compared to the time required for electrons to travel through the tube.

Now assume that the velocity of the electrons in the stream 11 remains the same as before (being determined by the potential difference between the cathode 3 and the grid 8) but that the frequency of the radio waves applied to the antenna 12 is enormously increased so that the period of a single cycle of the radio frequency currents applied to electrodes 6 and 7 is substantially less than the time required for an electron to travel from the grid 8 to the anodes 4 and 5. Under these conditions, the polarities of the electrodes 6 and 7 will reverse many times while an electron in the stream 11 is travelling the length of the electrodes 6 and 7. As a result of the rapid reversal of polarity of the electrodes 6 and 7, each individual electron in the stream 11 will be alternately urged first toward one electrode and then toward the other during its longitudinal travel so that the total deflection will be substantially zero and little or no useful variation in potential will be applied to the three-electrode amplifying tube. This condition is illustrated in Fig. 3. It will be observed from this figure that some deviation of the electron stream 11 is produced but that it is very slight and is no greater adjacent the anodes 4 and 5 than at a point remote therefrom. Under the conditions outlined, the circuit of Fig. 1 would be substantially inoperative to produce any useful result.

It has been assumed in the discussion in the preceding paragraph that all portions of each electrode 6 and 7 would be of substantially the same potential at any instant. Such a condition would be difficult, if not impossible, to attain because, at the extremely high frequencies assumed, the wave length of the radio frequency currents applied to the electrodes 6 and 7 might be comparable to the actual length of the eletrodes so that at a given instant one portion of each electrode might have one polarity and another portion another polarity. However, unless the velocity of the wave along the electrodes 6 and 7 were made equal to the velocity of the electrons in the stream 11, the result would be substantially the same as though all portions of each electrode were assumed to be at the same potential at any given instant. Furthermore, if the electrodes 6 and 7 constitute ordinary straight conductors, the velocity of electric waves therealong would be substantially the same as the velocity of light and it would be very difficult, if not impossible, to impart to the electrons in the stream 11 the velocity of light.

Of course, the device shown in Fig. 1 is theoretically operative even at extremely high frequency but the sensitivity of it does not then increase with the length of the deflecting elements and is no greater than in a device with deflecting elements of such length that electrons traverse them in less than the period of one-half cycle. However, such a device would be impracticable because of its lack of sensitivity. In other words, to produce appreciable deflection of the electron stream 11, the electrodes 6 and 7 must be of substantial length to produce a cumulative deflecting force on the electrons in the stream.

In a tube operating as described in connection with Figs. 1 and 2, the maximum effective length of the electrodes 6 and 7 for an operative tube may be calculated from the formula $$L = \frac{VT}{2}$$

where L is the length of the controlling elements, V is the speed of the electrons in the stream 11 and T is the period of oscillation of the wave applied to the electrodes 6 and 7.

Figure 4:
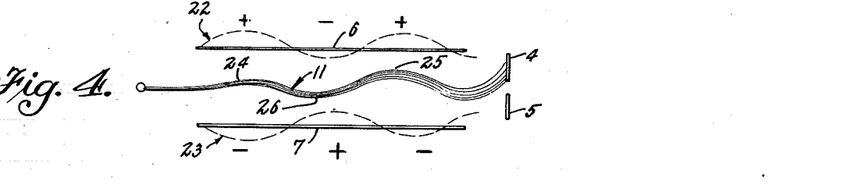
Fig. 4 is a schematic diagram illustrating the deflection of the electron stream in the tube of Fig. 1 when the tube is operated in such a manner as to produce travelling waves on the control electrodes of the tube, which waves travel at the same speed as the electrons in the electron stream.

In accordance with the present invention, it is possible to effectively use controlling elements of length much greater than $$\frac{VT}{2},$$

thereby greatly increasing the sensitivity of the device. The invention is based on the principle that if the speed of the electrons in the stream is made equal to the velocity of propagation of the electromagnetic waves along the control electrodes, then electrons which travel with the crest of the wave along the electrodes will be subject to a force acting continuously in the same direction throughout the whole length of the controlling element in spite of the fact that the time of travel may be many times the period of oscillation. Thus, referring to Fig. 4, assume that the waves generated in the antenna 12 and applied to elecfrodes 6 and 7 are of such high frequency that the potential distributed along the electrode 6 at a given instant is as represented by the curve 22 and the potential along the electrode 7 is as represented by the curve 23. Assume further that the velocity of propagation of the wave indicated by curves 22 and 23 along the electrodes 6 and 7 is substantially less than the velocity of light, (means for and methods of reducing the velocity of the waves will be described later) and that the velocity of the electrons in the stream 11 is made equal to the velocity of the electromagnetic wave along electrodes 6 and 7 by adjusting the potential 9 between the cathode 3 and the grid 8. Under the conditions outlined, at any given instant certain longitudinal points along the electrodes 6 and 7 will be positive and negative, respectively, and at those points electrons in the stream 11 will be deflected upwardly, as shown at 24 and 25. At the same time intermediate portions of the electrodes 6 and 7 will be negative and positive, respectively, and electrons in the stream 11 at this point will be deflected downwardly, as shown at 26. The wave, however, is moving from left to right along the electrodes at the same speed that the electrons in stream 11 are moving from left to right so that any given electrons are urged laterally in the same direction (either toward the electrode 6 or the electrode 7) throughout their travel between the electrodes, and a cumulative deflection of the electrons is produced substantially as was described in connection with Fig. 2. Therefore, the amplitude of lateral deflection of the electrodes may attain substantial proportions and cause the electron stream to be deflected to a substantial extent from one to the other of the anodes 4 and 5.

Figure 5:
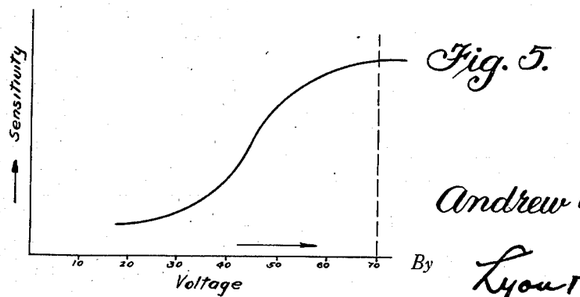
Fig. 5 is a graph illustrating the sensitivity characteristics of a tube operating in the manner illustrated in Fig. 4 when the velocity of the electron stream is varied with respect to the speed of propagation of the controlling waves along the control electrodes.

Although in a tube operating in accordance with Figs. 1 and 4 maximum sensitivity is obtained when the speed of the electrons in the stream 11 exactly equals the longitudinal speed of propagation of the exciting wave on electrodes 6 and 7, it is not essential that the speeds be exactly the same in order that the device be operative. The relation between sensitivity and the relative speeds of the electrons and the electromagnetic waves is illustrated graphically in Fig. 5 in which the ordinate represents sensitivity and the abscissa the potential difference between the grid 8 and the cathode 3 of a tube actually tested. In this test the velocity of propagation of the waves along the electrodes 6 and 7 remained constant, being determined by the construction of the electrodes, whereas the velocity of the electrons in the stream 11 varied with the potential between cathode 3 and the grid 8. It will be observed from Fig. 5 that the tube is not at all critical with respect to electron velocity but is operative over a relatively wide range of grid potential (grid potential referring to the potential difference between the cathode 3 and the grid 8). The sharpness of this curve depends upon the length of the controlling electrodes, which may be many wave lengths long, electrically, the sharpness being more pronounced the greater the length of the electrodes expressed in terms of wave lengths.

In Fig. 1 the electrodes 6 and 7 are shown as open-ended conductors so that if the antenna 12 were excited with extremely high frequency radio waves, these waves would be reflected from the ends of the electrodes 6 and 7 to produce the effect of standing waves. However, this would not in any way interfere with the operation of the device as described because a standing wave is really the resultant of two substantially equal waves travelling in opposite directions. The component of the standing waves travelling from right to left along the electrodes 6 and 7 would produce substantially zero effect upon the electrons in stream 11 for the reasons outlined in connection with Fig. 3, i. e., each electron in the stream 11 would be acted upon in rapid succession by succeeding waves, each tending to shift it in the opposite direction so that the net result would be negligible. On the other hand, the component of the standing waves travelling from left to right along the conductors would cumulatively affect the electrons in the stream 11 for the reasons set forth. The use of standing waves is very advantageous since the radio frequency voltage on electrodes 6 and 7 can be built up considerably if the circuit, of which elements 6 and 7 are a part, is tuned to the frequency of the received radio signal.

It will be apparent from the discussion so far that the usefulness of my invention is dependent upon practical methods of making the velocity of the electrons in the stream 11 equal to the velocity of propagation of electromagnetic waves along the electrodes 6 and 7. As previously stated, the velocity of electromagnetic waves along ordinary straight conductors is substantially equal to the velocity of light and it is very difficult, if not impossible, to produce an electron stream of such high velocity. It follows that the velocity of propagation of the electromagnetic waves along the electrodes 6 and 7 must be reduced substantially below the velocity of light. This may be done in a number of ways. The most obvious method and the one which I prefer to employ is to increase the actual lengths of the electrodes 6 and 7 relative to their dimensions parallel to the electron stream 11 by coiling or doubling back the conductors constituting the electrodes 6 and 7 so that the total length of conductor in each electrode is much greater than the distance from end to end of the electrode parallel to the electron stream. Coiling the conductor in the form of a helix has the further advantage that it increases the inductance of the conductor, which in itself tends to reduce the velocity of propagation.

Another method of reducing the velocity of propagation would be to employ as the electrodes 6 and 7 conductors coated with magnetic material to greatly increase the inductance of the conductors. It is doubtful, however, that this method is practicable with present known magnetic materials because of their low permeabilities and high hysteresis and eddy current losses at extremely high radio frequencies.

Figures 6, 7, 8:
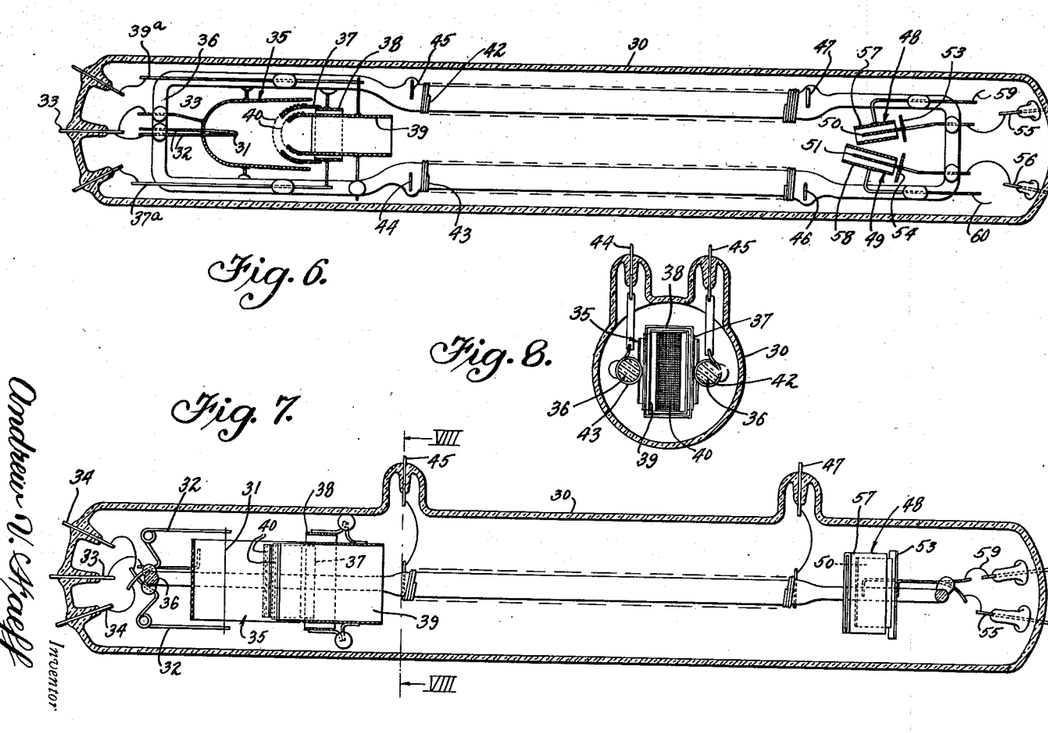
Fig. 6 is a view partly in section of one form of vacuum tube in accordance with my invention.
Fig. 7 is a view of the same tube taken in a plane at right angles to the plane of Fig. 6.
Fig. 8 is a cross section of the vacuum tube shown in Figs. 6 and 7 taken in the plane VIII—VIII of Fig. 7.

The construction of an actual tube for use in circuits similar to that shown in Fig. 1 is illustrated in Figs. 6, 7 and 8. This tube comprises an evacuated receptacle 30, in one end of which there is supported a straight filamentary cathode 31 at right angles to the longitudinal axis of the tube. Thus it is shown supported between a pair of spring elements 32, which in turn are supported from a glass standard 36. The spring elements 32, in addition to serving as supports for the cathode 31, supply current thereto and are connected to lead-in conductors 34 sealed through the wall of the receptacle 30. The cathode 31 is mounted within a U-shaped shield 35 supported from the glass standard 36, which extends substantially the length of the tube. The shield 35 is connected through a separate lead-in conductor 33 to the exterior of the receptacle 30 and in operation is maintained at a negative potential with respect to the cathode 31 to tend to reflect and focus electrons from the cathode toward the opposite end of the tube. Positioned within the open end of the U-shaped shield 35 is another slightly smaller semi-cylindrical element 37, the open end of which faces in the same direction as the shield 35. This element 37 is attached to an open-ended member 38 of substantially rectangular shape, which in turn is supported from the standard 36. Still another element 39 is positioned concentrically within the element 37 and also supported from the standard 36. Element 39, like element 37, is closed on all lateral sides and constitutes an open-ended box of rectangular shape. The elements 37 and 39 constitute the equivalent of the grid structure 10 in Fig. 1 and are preferably provided with open mesh grid structures 40 at their ends adjacent the cathode 31. Elements 37 and 39 are connected through separate lead-in conductors 37a and 39a to the exterior of the tube and in operation are maintained at positive potentials with respect to the cathode 31 under which conditions they accelerate electrons emitted by the cathode 31 and concentrate them in an electronic stream of substantially oblong cross section toward the opposite end of the tube. It is to be understood that structures for producing beams of electrons are broadly old and that other structures than those described may be employed.

The glass standard 36, as previously mentioned, is continuous and extends longitudinally of the tube on opposite sides of the electron stream, the latter being preferably directed along the axis of the tube. The mid-portions of the standard 36 are enlarged through that portion of their length juxtaposed to the electron stream issuing from the open-ended element 39 and support control electrodes which are constituted by wires 42 and 43 wound about the juxtaposed portions of the standard 36 in the form of helices. Opposite ends of each helix 42 and 43 are connected to separate lead-in conductors 44, 45, 46 and 47, respectively.

A pair of anodes 48 and 49 are positioned in the end of the tube opposite to the cathode 31 and beyond the ends of the helices 42 and 43. As shown in Figs. 6 and 7, each anode 48 and 49 comprises a flat plate 50 and 51, respectively, positioned at an angle to the longitudinal axis of the tube and secured to base plates 53 and 54, positioned at right angles to the plates 50 and 51, respectively. The plates 53 and 54 are supported from the standard 36, as shown, and are connected to separate lead-in conductors 55 and 56. For the purpose of absorbing secondary electrons emitted from the plates 50 and 51, respectively, they are surrounded by open-ended shields 57 and 58, respectively, which are of rectangular cross section and are supported from the standard 36 and connected to individual lead-in wires 59 and 60, respectively.

Figure 9:
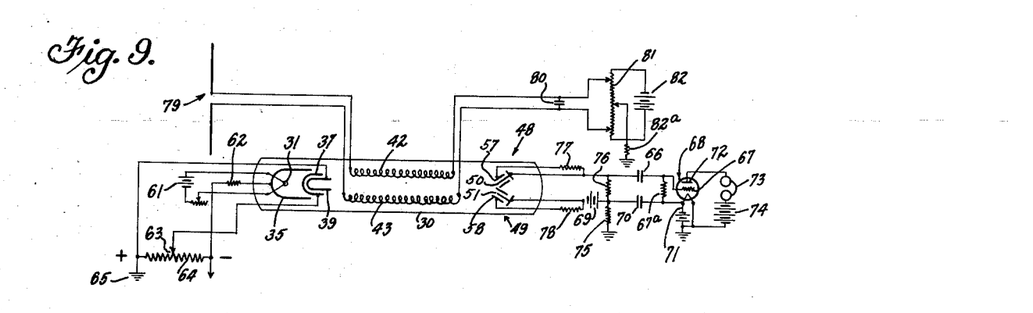
Fig. 9 is a schematic diagram of a detecting or rectifying circuit employing the vacuum tube shown in Figs. 6, 7 and 8.

The operation of the tube just described as a detector is illustrated in Fig. 9. Referring to Fig. 9, the cathode 31 is shown connected to a source of heating current 61 and the shield 35 is connected through a resistance element 62 to one end of the cathode 31. Certain of the electrons impinging upon the shield 35 from the cathode 31 tend to raise the shield 35 to a negative potential above the cathode 31, thereby producing a potential across the resistance 62. By properly proportioning resistance 62, the potential of the shield 35 may be regulated within limits. The grid elements 37 and 39 are maintained at positive potentials with respect to the cathode 31 by any suitable source of direct current which has been indicated as a rectifier in Fig. 9. The element 39 is maintained at a higher potential than the element 37 by connecting element 39 directly to the positive terminal of the rectifier and connecting the element 37 to a tap 63 of a potentiometer shunted across the rectifier. By suitably adjusting the potentiometer, the relative potentials of the elements 37 and 39 may be regulated to produce potential gradients between the cathode 31 and element 37 and between element 37 and element 39 of proper magnitudes to efficiently concentrate a stream of electrons derived from the cathode 31. The velocity of the electrons in the stream may also be regulated within certain limits by varying the potential of the element 39 with respect to the cathode 31. It has been found convenient to maintain the last grid element 39 through which the electrons pass at ground potential by grounding the positive terminal of the rectifier as indicated at 65.

The anodes 48 and 49 of the tube are connected substantially in the same manner previously described in connection with Fig. 1. Thus the anode 48 is connected through a condenser 66 to the grid 67 of a three-electrode amplifying tube 68 and the anode 49 is connected through a battery 69 and condenser 70 to the cathode 71 of the three-electrode amplifying tube 68. The anode 72 of tube 68 is connected through a telephone 73 and a B battery 74 to the cathode 71. A grid leak 67a is connected in shunt to the cathode 71 and grid 67 to maintain a suitably biasing potential upon the grid 67. A high impedance return path to ground for electrons impinging on anode 49 is provided through a resistance 75, and an impedance 76 provides a path to ground in series with resistance 75 for electrons accumulating on anode 48.

The shields 57 and 58 associated with the anodes 48 and 49, respectively, are connected to their associated plates 50 and 51 through resistances 77 and 78. In operation, secondary electrons emitted from the plates 50 and 51, respectively, impinge upon the shields 57 and 58, respectively, and return to the plates through the resistances 77 and 78. However, due to the impedance of elements 77 and 78, shields 57 and 58 are maintained negative with respect to their associated plates 50 and 51 so that a field is created between each plate and its associated shield tending to return secondary electrons emitted from each plate back to that plate. The main purpose of this type of anode structure is to prevent the secondary electrons emitted from elements 57 and 48 from impinging upon elements 58 and 49 and vice versa. This has been found desirable since the emission of secondary electrons tends to decrease the effect of deflection of the primary stream of electrons unless the secondary electrons are properly taken care of.

The helices 42 and 43, respectively, constituting the control electrodes for deflecting the electron stream within the tube, are connected in series in the respective sides of a Lecher circuit, one end of which is terminated by the antenna conductors 79 and the other end by a condenser 80, which is of sufficient capacity to act as a short circuit at the frequency for which the Lecher circuit is tuned and reflect the waves back along the circuit. The two ends of the Lecher circuit beyond the condenser 80 are connected across a potentiometer 81, the terminals of which are connected to a battery 82 and the mid-point of which is connected to ground through a resistance 82a. By suitable adjustment of the taps on potentiometer 81, constant D. C. potentials may be superimposed on the helices 42 and 43 for biasing the electron stream into a desired normal position. When the device is used as a detector, the relative constant potentials of helices 42 and 43 are so adjusted as to cause substantially the entire electron stream to impinge on plate 51 and shield 58 of anode 49.

When the antenna 79 is excited, standing waves are produced in the Lecher system, including the helices 42 and 43, and the distance between crests of waves on the helices is determined by the diameter and pitch of the helices. Likewise the velocity of propagation of the waves longitudinally along the helices is determined by their pitch and diameter and by making these of suitable values the velocity of the waves may be reduced substantially below the velocity of light. The speed of electrons in the beam projected through the tube is then adjusted to substantially equal the speed of propagation of the waves along the helices by adjusting the potentials on the electron accelerating electrodes 37 and 39. Under these conditions the waves on the two helices 42 and 43, which are 180 degrees out of phase with each other, produce a voltage gradient in the space traversed by the electron stream in a direction transverse to the direction of the stream, thereby periodically deflecting it. As a result of the deflection of the electron stream, the electronic currents flowing to the anodes 48 and 49 pulsate at the same frequency as the waves on the helices. The average current to either anode 48 or 49 will vary with the amplitude of the radio frequency wave provided the electron stream is biased (by suitably adjusting the potentiometer 81) so that the change of plate current is not linear with the deflection. Thus if the beam is biased by adjustment of potentiometer 81 so that the upper edge of the beam normally coincides with the lower edge of anode 48, then when no radio frequency signal is applied, substantially the entire current in the electron beam flows to anode 49 and none to anode 48. However, when the beam is periodically deflected, part of the total electronic current in the beam will flow to anode 48 and the value of the latter current will depend upon the amplitude of periodic deflection. The best adjustments for maximum and distortionless detection depend upon the cross section of the beam and the structure of the anodes. The varying electronic current applied to anode 48 passes through the high impedance element 76 to ground and thence back to the cathode of the tube through the rectifier 64. The potential across the impedance 76 varies with the average current therethrough, which in turn varies with the amplitude of the high frequency wave on the helices. This potential is applied through condenser 66 to the grid 67 of the amplifying tube 68, in which it is amplified and applied to the telephone 73. If the high frequency wave is modulated with a wave of audio frequency, the amplitude of the high frequency wave will vary at audio frequency and hence the current in the telephone 73 will vary at the audio frequency.

It is to be understood that it is not absolutely necessary to the operation of the circuit of Fig. 9 that the transmission line in which the helices 42 and 43 are inserted be terminated in a manner to produce reflection (as by means of the condenser 80). An absorption circuit having an impedance equal to the surge impedance of the line may be substituted for the condenser 80, in which case there will be no reflection and no standing waves produced. However, when the waves are reflected, their amplitude is increased, thereby making the circuit more efficient.

Figure 10:
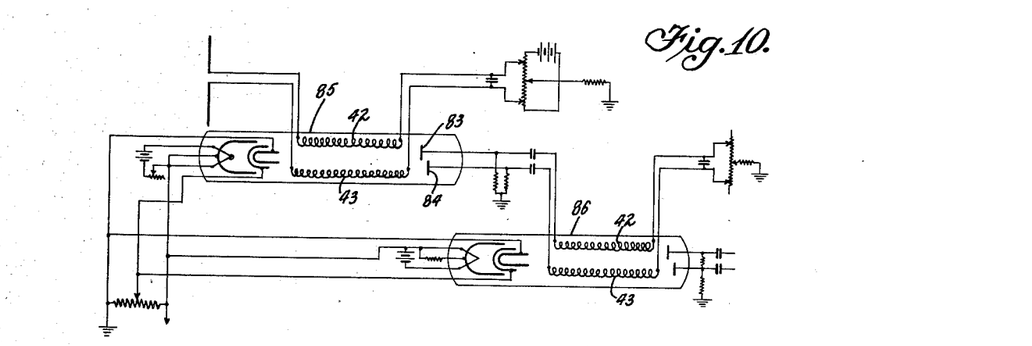
Fig. 10 is a schematic diagram of an amplifying circuit employing tubes of the type shown in Figs. 6, 7 and 8.
Figure 13:
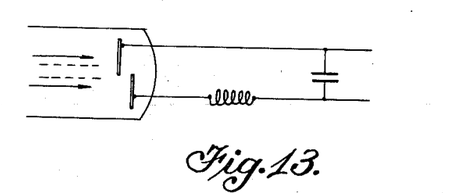
Fig. 13 is a detail diagram illustrating a modification of the circuit shown in Fig. 10.

Fig. 10 discloses a schematic circuit including two tubes in accordance with my invention connected for use as high frequency amplifiers. The tubes shown in Fig. 10 are substantially the same as that disclosed in Fig. 9 except for the anode structure. The tube shown in Fig. 9 functioned as a detector, under which conditions capacity between the two anodes 48 and 49 was not particularly objectionable because of the fact that the frequency of the desired component of the currents applied to the anodes was low (audio frequency, for instance). In Fig. 10, however, the tubes do not detect but merely amplify the extremely high radio frequencies and therefore it is desirable that the capacity between the anodes be kept at a low value. For this reason one of the anodes 83 is positioned in front of the other anode 84 to increase the actual distance between the anodes and thereby reduce the inter-anode capacity without spacing the lower edge of the anode 83 above the horizontal axial plane of the tube or spacing the upper edge of anode 84 below this horizontal axial plane. The helices 42 and 43 of the first tube 85 of the amplifier in Fig. 10 are connected in a Lecher system, including an antenna and D. C. biasing circuit exactly as described in connection with Fig. 9. The helices 42 and 43 of the second tube 86 in Fig. 10, however, are connected in a Lecher system connected at one end to the anodes 83 and 84 of tube 85. Because of the manner of connection, it is particularly essential that the capacity between anodes 83 and 84 be kept at a low value because in order to efficiently utilize the energy of electrons striking the anodes 83 and 84 to excite oscillations in the Lecher circuit connected thereto, the input impedance of this circuit must approximate the impedance of the tube. If the tube impedance is high, the impedance of the tuned circuit as viewed from the anodes of the tube must also be high. This means that the capacity between the anodes must be small compared to the capacity per unit length of the tuned circuit. However, in order to fully utilize the electronic beam in the tube, the dividing line between the anodes must be of zero width. The effect of a dividing line of zero width is obtained without actually bringing the anodes close together by positioning them in the manner described, one ahead of the other. This arrangement, however, introduces a phase difference between the electronic currents impinging on the two anodes. In other words, the electrons arrive at anode 84 later than at anode 83. However, if this phase difference is made equal to 360 electrical degrees or a multiple thereof, the effect of the beam in exciting the tuned circuit (the Lecher circuit) will be essentially the same as if the anodes 83 and 84 were positioned in the same transverse plane, provided this relative displacement of the anodes does not substantially impair the symmetry of the Lecher circuit connected to the anodes. No substantial impairment of the symmetry of the Lecher circuit occurs if the velocity of electrons in the electron stream is small compared to the velocity of propagation of waves along the Lecher conductors, which is usually true. However, the symmetry can be restored by introducing an extra length of conductor in one leg of the Lecher circuit, as shown in the detailed view of Fig. 13. Symmetry can also be maintained by extending the Lecher conductors from the anodes in a direction perpendicular to the plane of the helices, so that the longitudinal spacing between the anodes equals the spacing between the Lecher conductors.

Figure 12:
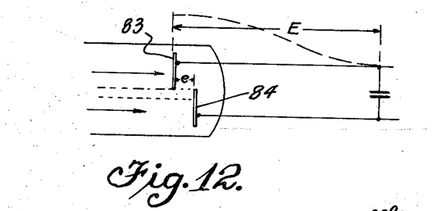
Fig. 12 is a detail view illustrating the relative positioning of the anodes in a tube of the type shown in Fig. 10.

In a practical tube the actual longitudinal spacing between the anodes 83 and 84 relative to the wave length of the radio frequency waves on the Lecher system is illustrated in Fig. 12. It will be observed that the longitudinal distance $e$ between the anodes 83 and 84 is small as compared to the length $E$ of the wave on the Lecher conductors. Therefore, the shortening or lengthening of one of the conductors of the Lecher system by the distance e does not seriously disturb the symmetry of the Lecher circuit.

Figures 14, 15, 16:
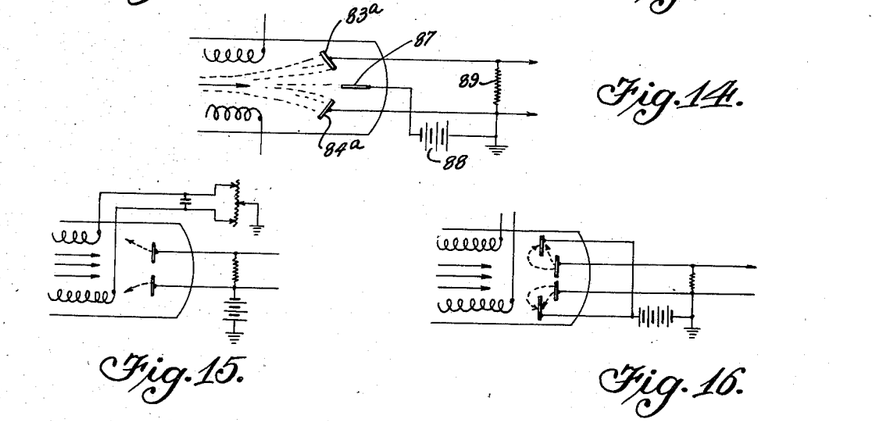
Fig. 14 is a detail view showing a modified form of anode structure for tubes of the type shown in Figs. 6, 7 and 8.
Fig. 15 is a detail view showing a modification of the tube structure and circuit shown in Fig. 10.
Fig. 16 is a detail diagram showing still another modification of the tube structure and circuit shown in Figs. 9 or 10.

Still another method of reducing the capacity between the anodes is shown in Fig. 14, in which the anodes 83a and 84a are positioned substantially at the same point longitudinally of the tube but are separated by an electrode 87 which is maintained at a negative potential with respect to the anodes 83a and 84a by connecting it through a battery 88 to ground. An impedance 89 is connected between anodes 83a and 84a at the voltage node of the timed Lecher system. The electrode 87 being negatively charged tends to disperse the electron stream laterally toward the anodes 83a and 84a so that as the beam is deflected laterally it impinges to a greater or less extent on the two anodes. This method of reducing the capacity between the anodes is advantageous in that it makes the same tube suitable for a wide range of frequencies.

Obviously the output of the amplifying circuit shown in Fig. 10 may be connected to any desired device. Thus it may be connected to a detector of the type shown in Fig. 9.

Figure 11:
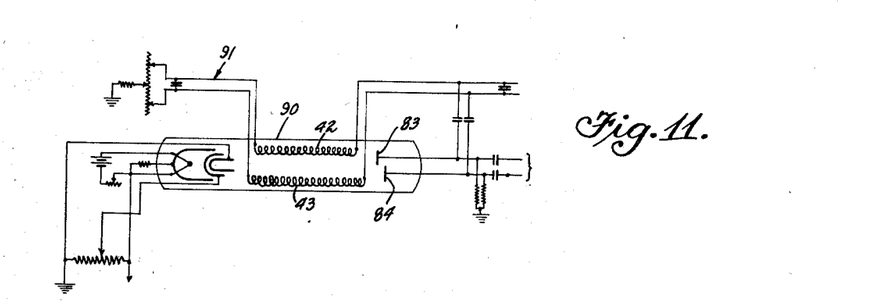
Fig. 11 is a schematic diagram of an oscillator circuit employing tubes of the type shown in Figs. 6, 7 and 8.

There is shown in Fig. 11 an oscillator circuit utilizing a tube in accordance with my invention. This circuit utilizes a tube 90 of the same type as the tubes 85 and 86 in Fig. 10, in which the control electrodes or helices 42 and 43 are included in a Lecher circuit 91 and in which the anodes 83 and 84 of the tube are also connected into the Lecher circuit at suitable points. With this arrangement only a small proportion of the output potential developed in the anodes 83 and 84 will be required to maintain oscillations in the Lecher system 91 so that the excess power may be delivered to an output circuit as shown.

Obviously various modifications may be made in the circuits shown in Figs. 9, 10 and 11. Thus by employing in the circuit of Fig. 9 a tube of the type shown in Figs. 10 and 11 and feeding back a portion of the radio frequency current in the output circuit of the tube, into the antenna circuit in the manner disclosed in Fig. 11, a regenerative detector may be obtained.

Figure 21:
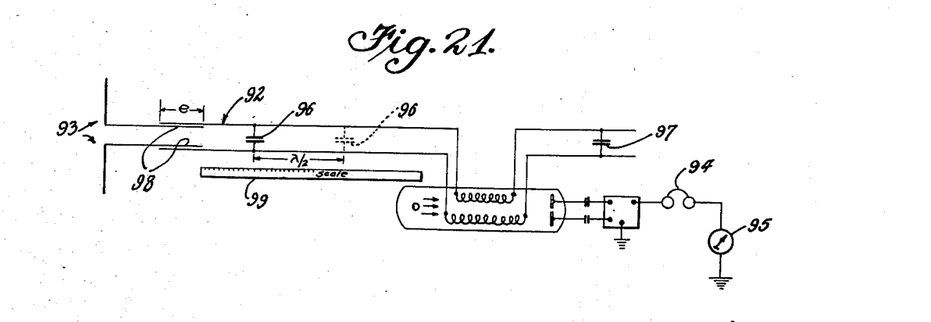
Fig. 21 is a schematic diagram of a wave meter circuit employing a vacuum tube of the type illustrated in Figs. 6, 7 and 8.

My tube may be employed in a wave meter circuit, as shown in Fig. 21, in which the control electrodes or helices of the tube are connected in a Lecher system 92 of adjustable length connected to an antenna 93, the tube in this instance functioning as a detector to detect or rectify the received wave and apply it to a telephone 94 or an indicating meter 95. This circuit is operated as follows: First condenser 96 is removed from the Lecher wires and the position of a condenser 97 and the length of the telescoping conductors 98 is adjusted to obtain a maximum signal in the telephone 94 (if modulated radio waves are received) or a maximum deflection of the meter 95 (if unmodulated waves are received). Then the condenser 96 is placed on the Lecher system and moved therealong into the position giving maximum amplitude of detected signal as shown by the telephone 94 or the meter 95. The distance between the two adjacent positions of the condenser 96 giving maximum signal will then be equal to half the wave length of the received signal and this distance can be readily read from a scale 99 positioned adjacent thereto.

Figure 22:
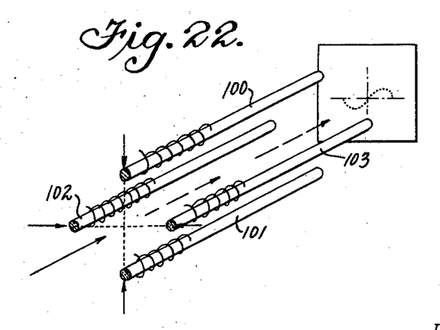
Fig. 22 is a schematic diagram of an oscillograph tube constructed in accordance with the invention.

My invention is also adaptable for use in cathode ray oscillographs, in which the electron stream instead of being directed upon anodes, as previously described herein, is projected upon a fluorescent screen. The deflection of the beam in one plane is obtained by a pair of opposite helices 100 and 101, respectively, in Fig. 22, and in the opposite plane by a pair of helices 102 and 103, respectively. All of these helices are so proportioned as to pitch and diameter that the speed of propagation of electromagnetic waves therealong is substantially the same as the speed of propagation of the charged particles in the electron stream so that travelling waves on any or all of the different helices produce cumulative effects on the electrons in the stream. In operation one pair of opposite helices would be connected to a source of oscillations to be measured or observed and the other pair of helices connected to a control wave of predetermined frequency in accordance with present accepted oscillograph practice.

Numerous modifications may be made in the tube structures shown in Figs. 6, 7, 8 and 10 in addition to those already mentioned. Thus it is obvious that since the control electrodes constituted by the helices 42 and 43 in Fig. 6 are not intended to absorb electrons from the electron stream, these electrodes may if desired be positioned exterior of the envelope 30 of the tube, under which conditions the envelope would preferably be flattened and the helices 42 and 43 mounted closely against the exterior of the flattened sides of the envelope to bring them as close to the electron stream as possible.

Furthermore, it is not essential that the helices 42 and 43 be circular in cross section. They may be flattened, as shown in Figs. 17 and 18, thereby juxtaposing a larger surface of the conductor to the electron stream.

In all the structures heretofore described the longitudinal velocity of the electron stream is constant because of the fact that the electron concentrating structure and the anodes, at opposite ends respectively of the stream, are maintained substantially at the same average potential so that no potential gradient of any magnitude exists longitudinally of the stream. Under these conditions it is desirable that the electromagnetic control waves travel along the control electrodes at constant velocity, which result is secured by making the helices of the same pitch and diameter throughout their length. It may be desirable, however, under certain conditions to vary the velocity of the electron stream at different longitudinal points thereon and correspondingly vary the velocity of the electromagnetic wave along juxtaposed portions of the control electrodes.

Figures 17, 18, 19, 20:
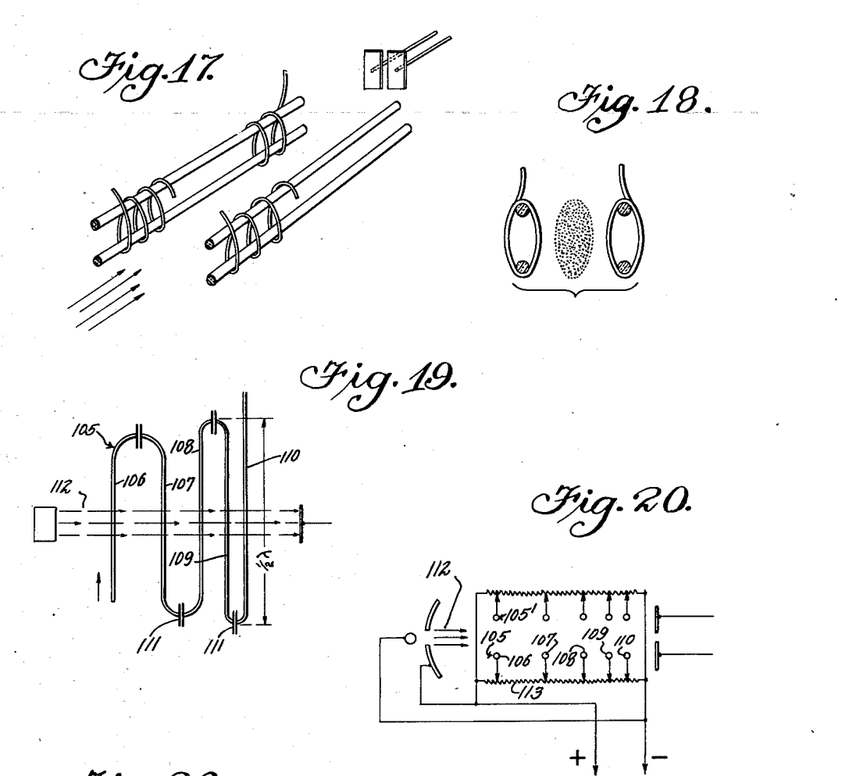
Fig. 17 is a detail view showing a modified form of the control electrode structure shown in Figs. 6, 7 and 8.
Fig. 18 is a detail cross section of the structure shown in Fig. 17.
Fig. 19 is a schematic sectional view showing still another modified form of the control electrode structure illustrated in Figs. 6, 7 and 8.
Fig. 20 is a schematic diagram illustrating a circuit in which the tube illustrated in Fig. 19 is adapted to be used.

One form of apparatus utilizing non-uniform velocities of the electrons in the stream and of the electromagnetic wave along the control conductors is shown in Figs. 19 and 20. Fig. 19 is a highly schematic sectional view showing one control electrode 105 positioned on one side of the electron stream and corresponding in function to the electrode 42 in Fig. 9. Another electrode exactly similar to electrode 105 and corresponding to the electrode 43 in Fig. 9 would be positioned on the other side of the electron stream. Electrode 105 instead of comprising a continuous wire wound in the form of a helix, as shown in Fig. 9, comprises a plurality of straight conductors 106, 107, 108, 109 and 110 connected together in series by means of condensers 111 so that the individual sections are insulated for direct current. All the conductors 106 to 110, inclusive, lie in a single plane parallel to and positioned to one side of the electron stream 112 and the opposite electrode is similar in structure and positioned on the other side of the electron stream and in a plane parallel to the plane of electrode 105. The electrons in the stream 112 are initially accelerated in any desired manner, such as that described in connection with Figs. 6 to 9, and are further focused or concentrated as they travel between the control electrodes 105 and 105′ (Fig. 20) by applying more and more negative potentials to the successive sections of each control electrode. In Fig. 20 these negative potentials are shown applied to the various sections of the control electrode 105 by connecting the respective sections at different points on a potentiometer 113 which is connected at opposite ends to a suitable source of direct current. The various sections of the opposite control electrode 105 are similarly connected to a source of D. C. biasing potential. The first sections 106 of each control electrode 105 and 105′ are preferably maintained substantially at the potential of the shield at the cathode end of the tube. Therefore, the more remote sections 107, 108, 109 and 110 of the control electrodes produce a potential gradient in a direction parallel to the electron stream opposing the direction of travel of the electrons and thereby reducing their velocity progressively as they move toward the anodes. To correspondingly reduce the velocity of the electromagnetic control waves on the control electrodes 105 and 105′, successive sections of the control electrodes are positioned closer together, as clearly shown in Figs. 19 and 20. The structure has the advantage that it is capable of producing a more concentrated electron stream at the anode end of the tube than is the case where the electron stream is not exposed to a focusing field. The electromagnetic waves travelling along the two control electrodes 105 and 105′ are opposite in phase at juxtaposed points so that an alternating transverse electric field is produced which cumulatively deflects the electrons from one anode to the other in accordance with the high frequency waves impressed on the control electrodes. It may be mentioned here that since the conductors 106 to 110, inclusive, in the various sections of the controlling elements are placed at right angles to the direction of the electronic beam, the transverse electric field produces the deflection of electrons. The magnetic field of the wave has practically no effect because it is acting substantially parallel to the direction of motion of electrons in the stream. The same condition obtains when helices are used as the control electrodes since the magnetic field exterior of a helix is negligible and the deflection of electrons is mainly due to the electric field component of the wave.

In the circuit of Figs. 19 and 20, the D. C. biasing potential is preferably connected to the conductors 106 to 110, respectively, at voltage nodal points along the latter so that these connections do not affect the propagation of the electromagnetic waves along the conductors. The individual sections of the conductors 106 to 110 may be tuned so as to produce voltage nodes at condensers 111, at which points D. C. connections would be made.

It has been previously mentioned that the average velocity of electrons in a stream of the type of the tube to which this invention relates is usually such that a considerable number of secondary electrons are emitted from the anodes. The current resulting from this secondary emission is usually approximately proportional to the primary current in the field and if there is no electric field at the anodes the secondary electrons may go to either anode (unless a shielding structure such as disclosed in Figs. 6 to 9 is employed) thereby minimizing the changes of current to anodes due to the deflection of the primary beam. With the structure shown in Figs. 6 and 7, the electric field existing between each anode and its enclosing shield prevents the majority of the secondary electrons from travelling toward the other anode or its associated shield so that the total current produced in each anode is very nearly equal to the primary current of the electron stream impinging thereon.

Under certain conditions the secondary emission from the anodes may be greater than the primary current. This condition has been utilized in an experimental model by applying a difference of potential between the helices (Fig. 15) and the anodes to make the helices positive with respect to the anodes so that substantially all secondary electrons emitted from the anodes were driven back to the helices. However, since there is a radio frequency potential on the helices, the flow of current to them is undesirable since radio frequency energy is absorbed by those electrons which strike the helix after being accelerated by the radio frequency potential on the helix. To prevent this undesirable effect, an auxiliary electrode may be placed between each helix and its associated anode, as shown in Fig. 16, and applying a suitable constant potential between the respective anodes and their associated auxiliary electrodes to cause the latter to absorb the secondary electrons emitted from the anodes.

Figures 23, 24, 25:
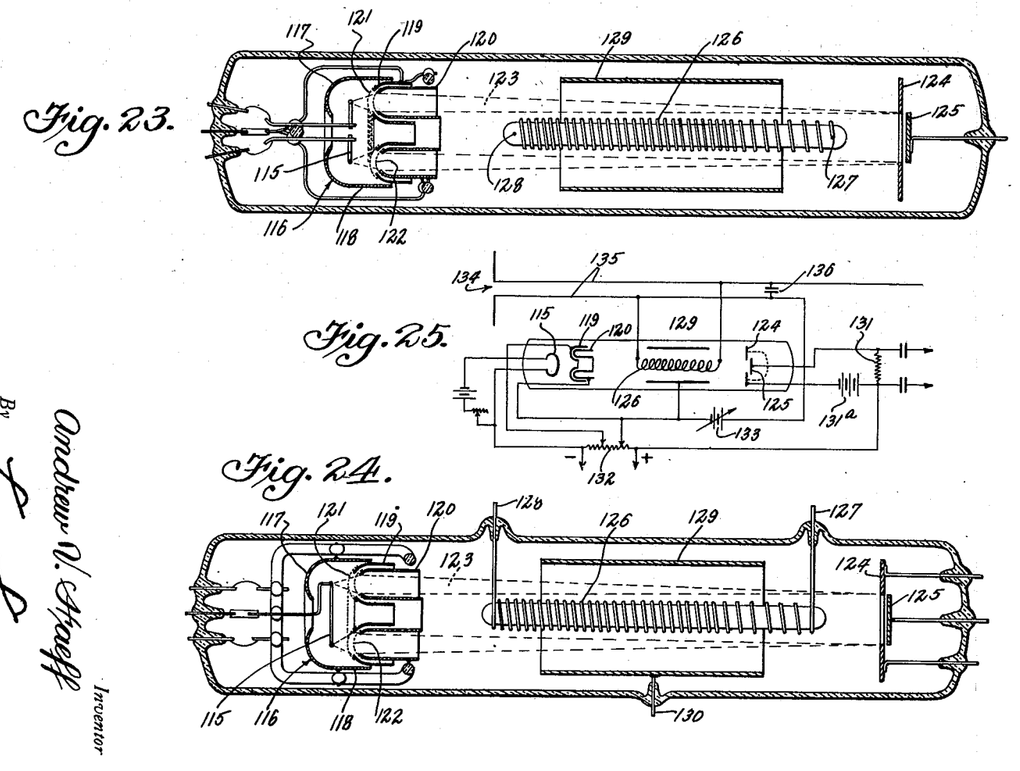
Fig. 23 is a longitudinal sectional view of an alternative tube construction to that shown in Figs. 6, 7 and 8.
Fig. 24 is a sectional view of the same tube shown in Fig. 23 taken in the longitudinal plane at right angles to the plane of Fig. 23.
Fig. 25 is a schematic diagram of a detecting or rectifying circuit employing a tube of the type illustrated in Figs. 23 and 24.

As an example of the various forms which electrical discharge devices in accordance with my invention may take, a special type of tube is illustrated in Figs. 23 and 24. This tube differs from the tube shown in Figs. 6 and 7 in that the cathode 115 instead of being straight is substantially circular and positioned concentrically with respect to the axis of the tube. The shield 116 surrounding the cathode 115 is in the form of an annular trough 117 joined to a cylindrical member 118 and the electron accelerating and concentrating elements 119 and 120 constitute annular troughs having open grid structures 121 and 122 at their rear ends which are concentric with and positioned in front of the circular cathode 115. This cathode and electron accelerating and concentrating structure produce a hollow electron beam 123 of circular cross section which is projected the length of the tube onto a pair of anodes 124 and 125, anode 125 being in the shape of a disc and anode 124 in the shape of a washer positioned concentrically with respect to anode 125. The anodes are so dimensioned that the hollow electron beam 123 normally impinges upon the circular division line between the two anodes. The anode 125 may be positioned back of the anode 124 to reduce the inter-anode capacity for reasons previously described.

The control electrode preferably consists of a single helix 126 positioned within the electron beam 123, the ends of the helix being brought out to the exterior of the tube through lead-in conductors 127 and 128, as shown in Fig. 24. A metallic cylinder 129 is positioned concentrically about the helix 126 and is of substantially larger diameter so that it surrounds and encloses a portion of the electron stream. The cylinder 129 is connected to the exterior through lead-in conductor 130 and serves (1) to prevent accumulation of charges on the glass walls of the tube; (2) to provide means for establishing a constant radial electric field between the helix and the cylinder to bias the stream whereby it impinges in desired degree upon the two anodes 124 and 125, and (3) to shield the helix from external fields so that the sensitivity of the device does not depend upon the proximity of external bodies.

A circuit for use with the tube described is shown in Fig. 25. It will be observed that the cathode is heated by an independent source of direct current connected to opposite ends thereof and that the anodes 124 and 125 are maintained at average potentials positive with respect to the cathode by means of a source of potential indicated as a rectifier. The anode 124 is shown connected directly to the positive terminal of the rectifier through a compensating battery 131a and the anode 125 is connected to the positive terminal of the rectifier through an impedance element 131. The normal average electronic current flowing to anode 125 produces a potential drop in the impedance 131 which would normally maintain this anode at a different potential from anode 124 were not the battery 131a provided to compensate therefor. The electron accelerating and concentrating elements 119 and 120, respectively, are maintained at suitable positive potentials with respect to the cathode 115 by connecting them to taps on a potentiometer 132 connected across the rectifier, and the cylinder 129 is shown connected to the final electron concentrating element 120 to maintain them at the same potential and eliminate any potential gradient in that portion of the electron stream between element 120 and cylinder 129. A radial potential gradient for biasing the electron beam into a desired normal position with respect to the anodes 124 and 125 is provided by means of a source of variable potential 133 connected between the cylinder 129 and the helix 126.

The control electrode constituted by helix 126 is energized from any suitable source of potential by connecting the ends of the helix thereacross. In Fig. 25 the source of potential is shown as an antenna 134 connected to a pair of Lecher conductors 135, the latter being terminated by a condenser 136 adjustable therealong for producing standing waves in the manner that has been previously described. The ends of the helix 126 are preferably connected across two Lecher conductors 135 at such points as to produce a maximum excitation of the control electrode.

Because of the manner in which the helix 126 and cylinder 129 are connected through the potentiometer 132 to the rectifier and of the fact that the anodes are connected to the positive terminal of the rectifier, the anodes are maintained at an average positive potential with respect to the helix 126 and cylinder 129 so that secondary electrons emitted from the anodes return to the anodes. Furthermore, due to the potential gradient existing between the helix 126, cylinder 129 and anodes, the primary electrons in the beam are accelerated during the last part of their travel to the anodes. In order to make maximum use of the deflecting effect of the electromagnetic waves on the helix, the velocity of the waves on the right end portion of the helix is increased to correspond with the increased speed of the electrons in the adjacent portion of the beam by suitably increasing the pitch of the helix at the end. By this means the velocity of the electromagnetic waves along the helix is approximately equal at any point to the velocity of the electrons in the portion of the stream adjacent that point although this velocity is not constant at all points along the helix. When the device is in operation the forces exerted on the beam, due to standing or travelling electromagnetic waves on the helix, are directed radially so that the waves on the helix produce periodic contractions and expansions of the diameter of the stream, which in turn produces periodic variations in the currents flowing to the anodes. The tube can be used as a detector, amplifier or oscillator by employing it in circuits similar to those disclosed in Figs. 9, 10 and 11.

It is to be distinctly understood that my invention is not limited to any particular method of producing a stream of electrons nor to the use of control electrodes of particular form, nor to anodes on which the electrons impinge of particular form. Furthermore, although specific methods have been shown in the various circuits of obtaining constant biasing potentials, other known methods may be substituted for those shown. There are many satisfactory ways of producing and concentrating electron streams and the control electrodes may have other forms and shapes than those shown. The control electrodes may be excited either with standing or travelling waves of high frequency. In short, I consider my invention to be of broad application and limited only as set forth in the appended claims.

I claim:

1. The method of deflecting a stream of electrically charged particles in response to high frequency oscillations, which comprises producing an electromagnetic wave of the frequency of said oscillations and propagating said wave in a path adjacent to said stream and in the same general direction as the stream and at such velocity relative to the velocity of the charged particles in the stream and to the directions of the stream and electromagnetic wave path, respectively, that the velocity component of said electromagnetic wave parallel to said stream is substantially the same as the velocity of the charged particles in the stream.

2. In an electrical discharge device having means for producing a stream of charged particles and means responsive to deflection of the stream, means for propagating an electromagnetic wave in a path adjacent to said stream at at least approximately the same velocity as the charged particles in the stream whereby successive portions of said electromagnetic wave cumulatively deflect charged particles in said stream in the same lateral direction during a substantial portion of their travel.

3. In an electrical discharge device having means for producing a stream of charged particles and means responsive to deflection of the stream, means for propagating an electromagnetic wave in a path adjacent to said stream at at least approximately the same velocity as the charged particles in the stream whereby successive portions of said electromagnetic wave cumulatively deflect charged particles in said stream in the same lateral direction during a substantial portion of their travel, said electromagnetic wave propagating means comprising two conductors on opposite sides of said stream, which conductors are adapted to be connected to and form a part of a two-wire electric transmission line.

4. In an electrical discharge device having means for producing a stream of charged particles and means responsive to deflection of the stream, means for propagating an electromagnetic wave in a path adjacent to said stream at at least approximately the same velocity as the charged particles in the stream whereby successive portions of said electromagnetic wave cumulatively deflect charged particles in said stream in the same lateral direction during a substantial portion of their travel, said electromagnetic wave propagating means comprising a coiled conductor, the axis of which coil is at least approximately parallel to said stream.

5. In an electrical discharge device having means for producing a stream of charged particles and means responsive to deflection of the stream, means for propagating an electromagnetic wave in a path adjacent to said stream at at least approximately the same velocity as the charged particles in the stream whereby successive portions of said electromagnetic wave cumulatively deflect charged particles in said stream in the same lateral direction during a substantial portion of their travel, said electromagnetic wave propagating means comprising a coiled conductor in the shape of a flattened helix, the axis of the helix lying at least approximately parallel to said stream.

6. In an electrical discharge device having means for producing a stream of charged particles and means responsive to deflection of the stream, means for propagating an electromagnetic wave in a path adjacent to said stream at at least approximately the same velocity as the charged particles in the stream whereby successive portions of said electromagnetic wave cumulatively deflect charged particles in said stream in the same lateral direction during a substantial portion of their travel, said electromagnetic wave propagating means comprising a zigzag conductor extending at least approximately parallel to said stream.

7. In an electrical discharge device having means for producing a stream of charged particles and means responsive to deflection of the stream, means for propagating an electromagnetic wave in a path adjacent to said stream at at least approximately the same velocity as the charged particles in the stream whereby successive portions of said electromagnetic wave cumulatively deflect charged particles in said stream in the same lateral direction during a substantial portion of their travel, said electromagnetic wave propagating means comprising a zigzag conductor extending at least approximately parallel to said stream, successive portions of said conductor being spaced progressively closer together and being interconnected by condensers, whereby different constant potentials may be superimposed on different portions.

8. In an electrical discharge device, means for producing a concentrated electron stream, means for variably deflecting said stream in response to electric oscillations, an anode at a positive potential positioned to variably intercept said stream according to the deflection of the latter, a shield adjacent said anode and extending along a substantial portion thereof for intercepting secondary electrons emitted from said anode, said shield means having its longitudinal axis pointing substantially in the direction of travel of said stream of electrons and being adapted to be connected to said anode and maintained at a less positive potential average from the potential of said anode.

9. In an electrical discharge device, means for producing a concentrated electron stream, means for variably deflecting said stream in response to electric oscillations, a pair of anodes positioned to variably intercept said stream according to the deflection of the stream, a pair of shields adjacent and surrounding said respective anodes over the major portion of their lengths for intercepting secondary electrons emitted from said anodes, each shield being adapted to be maintained at a different potential with respect to its associated anode.

10. In an electrical discharge device, means for producing a stream of charged particles, means for propagating an electromagnetic wave in a path adjacent said stream at at least approximately the same velocity as the charged particles in the stream, whereby successive portions of an electromagnetic wave propagated along said means cumulatively deflect charged particles in said stream during a substantial portion of their travel, a pair of anodes positioned to variably intercept said stream according to the deflection of the stream, one of said anodes being longitudinally spaced from the other a distance substantially equal to the longitudinal distance between crests of successive electromagnetic waves on said electromagnetic propagating means, whereby the capacity between said anodes is reduced but the relative phase of electronic currents produced in said anodes by said stream is the same as though the anodes were both positioned in the same plane.

11. A system comprising an electrical discharge device having means for producing a stream of charged particles, means for propagating an electromagnetic wave in a path adjacent to said stream at at least approximately the same velocity as the charged particles in the stream, whereby successive portions of said electromagnetic wave cumulatively deflect charged particles in said stream in the same lateral direction during a substantial portion of their travel, and an anode positioned to variably intercept said stream according to the deflection of the latter; in combination with a transmission line connected to said wave-propagating means, said transmission line being so proportioned and terminated as to develop standing waves thereon when excited at a predetermined frequency, means for exciting said transmission line at said predetermined frequency, and means responsive to potential variations connected to said anode.

12. In combination, a conductive target of limited lateral dimensions, means for emitting and projecting a stream of charged particles at a predetermined velocity towards said target, means for altering the longitudinal velocity of said particles at different longitudinal points in said stream, means for propagating an electromagnetic wave in a path adjacent said stream at velocities varying along said path according to the velocities of particles in the juxtaposed portions of the stream, whereby successive portions of said electromagnetic wave cumulatively deflect charged particles in said stream in the same lateral direction during a substantial portion of their longitudinal travel and cause them to impinge in varying degree on said target, and means connected to said target responsive to variations in the number of charged particles impinging on the target.

13. In combination, a conductive target of limited lateral dimensions, means for emitting and projecting a stream of charged particles at a predetermined initial velocity towards said target, means for propagating an electromagnetic wave adjacent to and substantially parallel to said stream comprising a pair of zigzag conductors of varying pitch whereby the velocity of propagation of waves therealong parallel to said stream varies progressively along said stream, said conductors being divided into sections connected by condensers whereby different sections are insulated apart for direct current, means for applying progressively different potentials to successive sections of said conductors to concentrate electrons in said stream and progressively vary their longitudinal velocities in accordance with the wave-propagating velocity characteristics of the said conductors, whereby successive portions of an electromagnetic wave propagated along said conductors cumulatively deflect charged particles in said stream in the same lateral direction during a substantial portion of their longitudinal travel and cause them to impinge in varying degree on said target, and means connected to said target responsive to variations in the number of charged particles impinging thereon.

14. In combination, a conductive target of limited lateral dimensions, means for emitting and projecting a stream of charged particles at a predetermined velocity towards said target, a Lecher circuit comprising a pair of conductors of electrical length tuned to a predetermined frequency, each conductor including as a portion thereof a helix and said helices being positioned parallel to and on opposite sides of said stream, the pitch and diameter of said helices being so proportioned as to cause electromagnetic waves propagated therealong to travel at at least approximately the same speed as charged particles in said stream, whereby successive portions of an electromagnetic wave propagated by said helices cumulatively deflect charged particles in said stream in the same lateral direction during a substantial portion of their longitudinal travel and cause them to impinge in varying degree on said target, means for exciting said Lecher circuit, and means connected to said target responsive to variations in the number of charged particles impinging thereon.

15. In combination, a first Lecher circuit comprising a pair of juxtaposed parallel helices, means for projecting a first electron stream longitudinally between said pair of helices at a velocity at least approximately equal to the longitudinal wave-propagating velocity of said helices, a source of oscillations connected to said first Lecher circuit, a first pair of anodes positioned to variably intercept said first electron stream according to the lateral deflection of said stream produced by waves propagated along said first pair of helices, a second Lecher circuit also comprising a pair of juxtaposed parallel helices, and means for projecting a second electron stream longitudinally therebetween at a velocity at least equal to the longitudinal wave-propagating velocities of said helices associated with said second Lecher circuit, a second pair of anodes positioned to variably intercept said second electron stream according to the lateral deflection of said stream produced by waves propagated along the pair of helices associated therewith, said second Lecher circuit being connected to said first pair of anodes, and means responsive to high frequency oscillations connected to said second pair of anodes.

16. A system as described in claim 15 in which at least said first pair of anodes comprise elements spaced longitudinally apart, one rearwardly of the other, a distance equal to the distance between adjacent wave crests on the helices associated therewith and in which a coil is connected in series with the conductor of said Lecher circuit connected to said rear anode to compensate for the unsymmetrical positioning of said longitudinally spaced apart anodes.

17. A system comprising an electrical discharge device, means for producing a concentrated electron stream in said device, means for variably deflecting said stream in response to electric oscillations, a pair of anodes positioned to variably intercept said stream according to the deflection of the stream, at least one metallic shielding electrode located between said anodes and in a different plane than said anodes for shielding same from one another.

18. A system comprising an electrical discharge device having means for producing a stream of charged particles, means comprising a pair of helices on opposite sides of said stream for propagating an electromagnetic wave in a path adjacent to said stream at at least approximately the same velocity as the charged particles in the stream, whereby successive portions of said electromagnetic wave cumulatively deflect charged particles in said stream in the same lateral direction during a substantial portion of their travel, and an anode positioned to variably intercept said stream according to the deflection of the latter; in combination with a transmission line connected to said wave-propagating means, said transmission line comprising a pair of conductors, each conductor including as a portion thereof one of said helices, means for exciting said line at one end thereof and a condenser near the other end and bridged across said conductors for tuning the electrical length of said line to a predetermined frequency, a potentiometer at said last end having taps connected to said conductors, a source of constant direct current potential connected to said potentiometer, and means responsive to potential variations connected to said anode.

19. In an electrical discharge device, means for producing a concentrated electron stream, means for variably deflecting said stream in response to electric oscillations, a pair of anodes positioned to variably intercept said stream according to the deflection of the stream, a shield adjacent and surrounding at least one of said anodes over a substantial portion of its length for intercepting secondary electrons emitted from said anode, said shield being adapted to be maintained at a different potential than its associated anode, with respect to said means for producing the electron stream.

20. The method of deflecting a stream of electrically charged particles in response to high frequency oscillations, which comprises producing an electromagnetic wave of the frequency of said oscillations and propagating said wave in a path adjacent to said stream and in the same general direction as the stream and at such velocity relative to the velocity of the charged particles in the stream that the velocity component of said electromagnetic wave parallel to said stream is substantially the same as the velocity of the charged particles in the stream.

21. In combination, an electrical discharge device having a cathode for producing a concentrated electron stream, a pair of plates for variably deflecting said stream, a pair of anodes positioned to variably intercept said stream according to the deflection of said stream, a shielding electrode between said anodes, a resistance externally located with respect to said device and effectively connected across said pair of anodes, and a source of potential connected between one terminal of said resistance and said shield for applying a negative potential to said shield.

22. In an electrical discharge device, means for producing a concentrated electron stream, means for variably deflecting said stream in response to electric oscillations, a pair of anodes positioned to variably intercept said stream according to the deflection of the stream, a pair of shields adjacent and surrounding said respective anodes over the major portion of their lengths for intercepting secondary electrons emitted from said anodes, and a resistance connecting each shield to its respective anode.

23. In an electrical discharge device, means for producing a concentrated electron stream, means for variably deflecting said stream in response to electric oscillations, an anode at a positive potential positioned to variably intercept said stream according to the deflection of the latter, means for electrostatically shielding said anode comprising a shield adjacent said anode, said shield extending along a substantial portion of said anode and having its longitudinal axis pointing substantially in the direction of travel of said stream of electrons, and a resistance connecting said shield to said anode.

ANDREW V. HAEFF.